United States Patent [19]

Hasegawa

[11] 4,144,112

[45] Mar. 13, 1979

[54] METHOD OF PILING VENEER SHEETS

[75] Inventor: Katsuji Hasegawa, Nagoya, Japan

[73] Assignee: Meinan Machinery Works, Inc., Aichi, Japan

[21] Appl. No.: 791,220

[22] Filed: Apr. 27, 1977

[51] Int. Cl.$^2$ .......................... B27D 1/04; B32B 31/04; B65H 7/00

[52] U.S. Cl. .......................... 156/313; 144/245 C; 144/309 Q; 144/315 R; 156/563; 198/422; 271/227; 271/259; 414/35; 414/786

[58] Field of Search .............. 156/264, 313, 512, 558, 156/563, 559, 566, 299, 300, 351, 358, 360, 511, 517, 60; 214/6 H, 6 F, 152, 1 PE; 271/227, 229, 64, 236, 245, 234, 259, DIG. 3; 144/245 C, 281 R, 281 B, 309 Q, 315 R

[56] References Cited

U.S. PATENT DOCUMENTS

| | | | |
|---|---|---|---|
| 3,003,541 | 10/1961 | Prentice et al. | 156/558 |
| 3,247,042 | 4/1966 | Denton et al. | 156/313 X |
| 3,400,031 | 9/1968 | Crathern | 156/566 X |
| 3,483,065 | 12/1969 | O'Brien | 156/563 |
| 3,603,463 | 9/1971 | Billett et al. | 156/563 X |
| 3,642,151 | 2/1972 | Hayes | 214/6 H |
| 3,785,508 | 1/1974 | Hayden | 156/563 X |

*Primary Examiner*—Michael G. Wityshyn
*Attorney, Agent, or Firm*—Armstrong, Nikaido, Marmelstein & Kubovcik

[57] ABSTRACT

A method and an apparatus of piling veneer sheets for plywood sheets at a predetermined position comprising at least one stage of conveyer means having two horizontal, parallel and spaced conveyer belts to support a veneer sheet, stopping means to stop the veneer sheet when one edge of the veneer sheet reaches a predetermined position, detecting means to detect the veneer sheet when the veneer sheet is fed to or adjacent to the predetermined position, and pressing means for pressing the veneer sheet downwards in response to a signal from the detecting means to a predetermined piling position.

When the veneer sheet is stopped, one terminal edge is at said predetermined position. Thus, when veneer sheets are piled, the edges of the sheets maintain their position so that piled sheets can be readily used in plywood manufacturing process, and productivity of plywood sheets is improved.

4 Claims, 10 Drawing Figures

METHOD OF PILING VENEER SHEETS

BACKGROUND OF THE INVENTION

The present invention relates to a method and an apparatus of piling veneer sheets, and more particularly, to a method and an apparatus of piling veneer sheets so that one edge of the sheets is vertically aligned with each other, to simplify the succeeding plywood manufacture process.

The plywood manufacture process includes a process to pile a plurality of veneer sheets which are cut into predetermined dimensions. To this end, a plurality of veneer sheets should be transferred to a piling position in layers in such a condition that the edges of the layers are vertically aligned with each other.

Conventionally, step-like arranged two conveyers are controlled by output signals of photoelectric cells to detect each veneer sheet on each conveyer. When the photoelectric cell detects a veneer sheet, the conveyer is stopped. After both conveyers are stopped, both conveyers are started again so that the veneer sheet on the upper conveyer is passed beyond the front edge of the conveyer and is overlaid on the veneer sheet of the lower conveyer. However, the stops and starts of the conveyers are difficult to synchronize for the veneer sheets overlaid condition enabling the front edges of the veneer sheets to align vertically. Sometimes, the stagger amount between the front edges is some tens of millimeters, thus yield rate and quantity of plywood are unsatisfactory. To manufacture plywoods of determined dimension, the veneer sheets must be wide enough to include the stagger. Further, the process of piling up desired veneer sheets is performed by two stages, so that the apparatus is complex and is difficult to maintain. Further, total piling time is long, and productivity is low.

Another conventional process to pile veneer sheets utilizes a conveyer having two parallel conveyer belts to support both lateral opposite edge portions of a veneer sheet. When the front edge of the veneer sheet reaches a predetermined position, the conveyer is stopped and the conveyer belts are opened laterally to drop the veneer sheet downwards. Dropped sheets are piled under the conveyer. Another proposed apparatus provides pressing means which contacts the upper surface of the veneer sheet before the belts are opened, and presses the veneer sheet downwards as the belts are opened laterally. However, such conventional apparatus can not prevent the veneer sheet from floating horizontally or radially while dropping, so that the front edges of the piled sheets do not correctly align vertically.

In actual process, the edges of the sheets are aligned manually, so that many workers must be employed, and low productivity is the result.

SUMMARY OF THE INVENTION

Accordingly, the primary object of the present invention is to provide a method and an apparatus to pile veneer sheets so that one edge of the veneer sheets is aligned vertically.

The other object of the present invention is to provide a method and an apparatus of piling veneer sheets for improving the yield and productivity of manufacturing plywood sheets by repeating the process, that two veneer sheets are piled so that selected edges of the sheets are vertically aligned, and that one veneer sheet coated with adhesive on both surfaces is piled on the piled sheets.

According to one aspect of the present invention, there is provided a method of piling veneer sheets comprising the steps of: a) conveying at least one flexible veneer sheet on each conveyer means having two spaced elongated veneer sheet conveyer support elements which support both lateral opposite edge portions of the veneer sheet; b) stopping the advance of the veneer sheet when one edge of the sheet reaches a predetermined position; and c) pressing a middle portion of the veneer sheet quickly and vertically from above to project the sheet onto a predetermined piling position which is under the conveyer means.

According to another aspect of the present invention, an apparatus of piling veneer comprising: at least one conveyer means having two parallel and spaced veneer sheet conveyer support elements; drive means for driving said conveyer means to carry a veneer sheet supported at its both lateral opposite edge portions by said support element in a predetermined direction; stopping means adjacent to said conveyer means to stop said conveyer means when the front edge of said veneer sheet reaches a predetermined position; detecting means provided adjacent to said conveyer means for detecting the passing of the front edge of said veneer sheet and to transmit a detection signal; and pressing means mounted above the conveyer means receiving said detection signal and which moves downward at the time of the stop of the veneer sheet and presses the middle portion of the veneer sheet downward on a piling position under the conveyer means.

According to a further aspect of the present invention, an apparatus of piling veneer sheets comprising; at least one conveyer means having two parallel and spaced veneer sheet conveyer support elements; drive means for driving said conveyer means; detecting means for transmitting first and second signals when the front or rear edge of a veneer sheet which is supported by said conveyer means at its both lateral opposite edge portions reaches a predetermined position; stopping means for stopping said conveyer means in response to said first signal, and pressing means moving downwards in response to said second signal to press a middle portion of the stopped veneer sheet rapidly and vertically downwards to a place under said conveyer means.

BRIEF DESCRIPTION OF THE DRAWINGS

The objects and features of the present invention will be explained more fully with the accompanying drawings, shown only by way of example, in which.

DETAILED DESCRIPTION OF THE EMBODIMENTS

As shown in FIG. 1-4, veneer sheets piling apparatus, according to the present invention, is provided with a rear veneer sheets piling table 3 and a front veneer sheets piling table 4. Forwards of the tables 3 and 4, veneer sheet convey and support means such as conveyer belts 5 and 6, and 7 and 8 are arranged vertically aligned with each other, to convey the veneer sheet at right angles to the fiber direction of the sheets.

Downstream of the conveyer belts 5 and 6, and 7 and 8, another conveyer section having belts 5' and 6' and 7' and 8' respectively is arranged. The relation of belts of each conveyer section, i.e. relation between the belts 5 and 6, 5' and 6', 7 and 8, 7' and 8' is such that both belts are parallel with each other and spaced to support opposite edge portions of a veneer sheet to be conveyed. At least the downstream side conveyer sections are connected with a drive motor, not shown, by coupling means shown in FIGS. 5 and 6.

Figure 5:
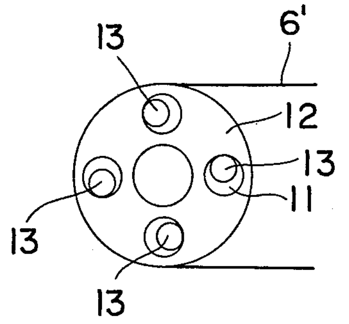
FIG. 5 shows an enlarged fragmentary view of FIG. 3 showing a pulley.
Figure 6:
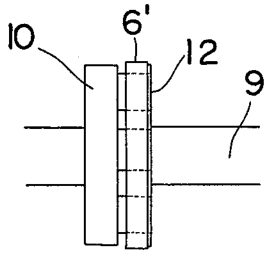
FIG. 6 shows a side view of FIG. 5.

As shown in FIGS. 5 and 6, a drive shaft 9 connected with a motor is provided with ferromagnetic disk-like flange 10 having a flat end surface. Juxtaposed to the flange 10, a pully 12 is rotatably mounted on said shaft 9. The end surface of the pulley 12 forms spaced recesses 11 into which permanent magnets 13 are inserted.

The belt 6' is engaged around the pulley 12 and the shaft 9 supporting the pulley 12 is rotatably supported by bearing means not shown.

When the belts 5' and 6' or 7' and 8' receive larger resistance than frictional force between the magnets 13 and the flange 10, the drive transmission coupling is no longer effective and the pulley 12 and the belts 5' and 6' or 7' and 8' are stopped.

Figure 7:
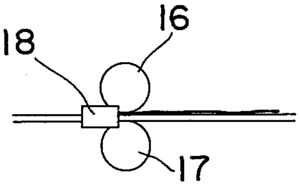
FIG. 7 shows an enlarged fragmentary view of FIG. 3 showing a stopper means.
Figure 8:
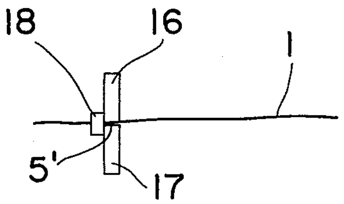
FIG. 8 shows a side view of FIG. 7.
Figure 9:
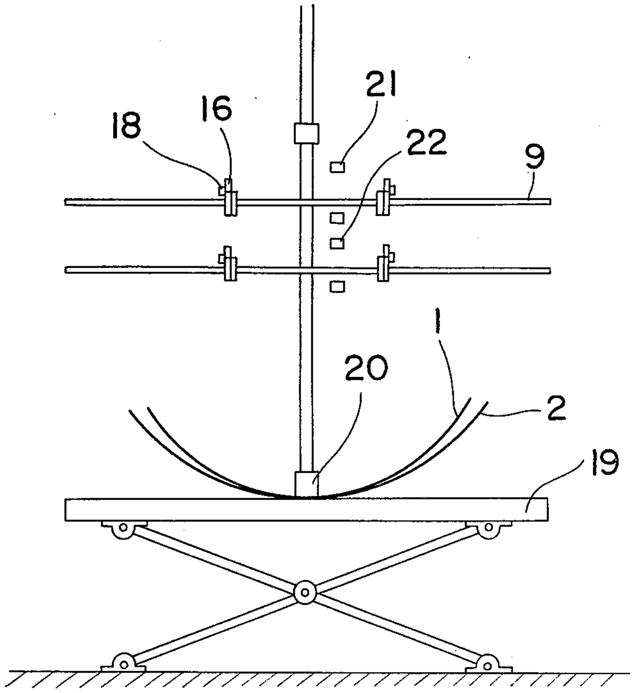
FIG. 9 shows an illustration of operation of the apparatus shown in FIG. 1.

At the downstream side of the conveyer sections having belts 5' and 6', and 7' and 8', veneer sheet stopper means 15 are provided adjacent to each of the belts 5', 6', 7' and 8'. The veneer sheet stopper means 15 is shown more clearly in FIGS. 7 and 8, and is provided with a pair of rotatable rollers 16 and 17 and a stopper 18 which forms a stopping surface slightly downstream of an imaginary line through the axis of the rollers 16 and 17.

Figure 2:
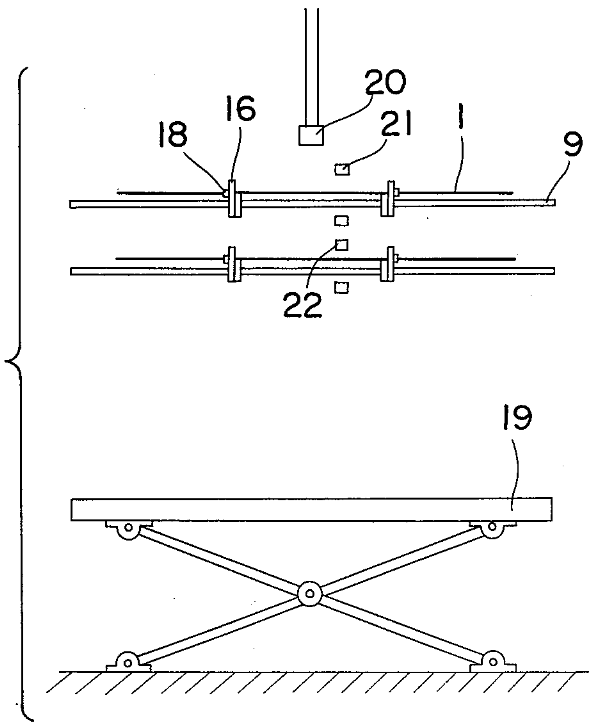
FIG. 2 shows a fragmentary end view taken along the line II—II of FIG. 1.
Figure 3:
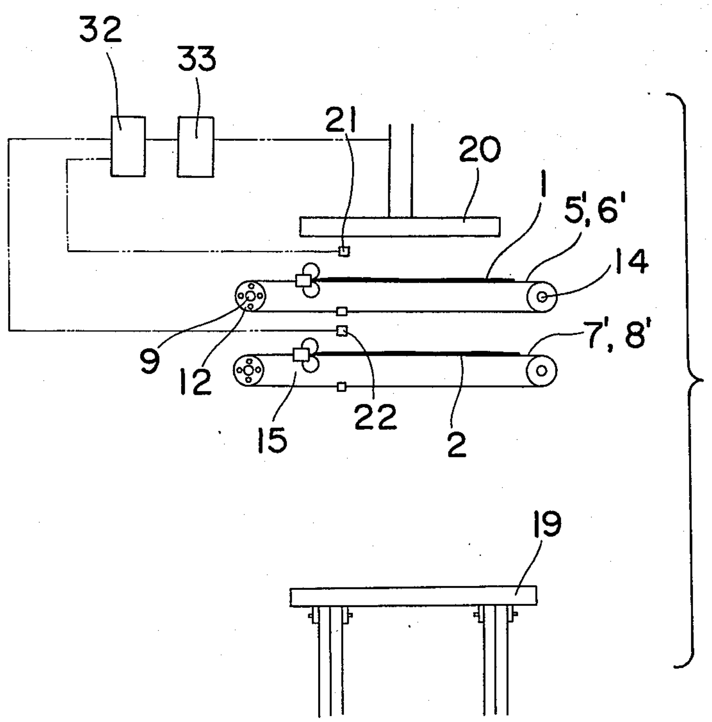
FIG. 3 shows an illustration, taken along the line III—III of FIG. 1, showing schematic electrical connection between detecter means and pressing means of the apparatus shown in FIG. 1.

As shown in FIGS. 2 and 3, the veneer sheet stopper means 15 are arranged to align with each other horizontally and vertically.

Above the center of the belts 5' and 6' and extending from the veneer sheet stopper means 15 to the upstream side, a vertically movable veneer sheet presser body 20 is provided, to press two veneer sheets on the belts 5' and 6', and 7' and 8' simultaneously downwards onto a piling table 19 provided under the belts 7' and 8'.

Photoelectric cells 21 and 22 are arranged on the upstream side of the stopper means 15 to detect presence of veneer sheets on the belts 5' and 6' and 7' and 8' independently. Whereas both photoelectric cells 21 and 22 detect the presence of veneer sheets, electric circuitry is provided to initiate downward movement of the presser body 20, after a predetermined time delay. As shown in FIG. 3, the outputs of the photoelectric cells 21 and 22 are connected with two input terminals of AND circuit 32, the output of which is connected through timer circuit 33 to an actuater, not shown, of the presser body 20.

Figure 1:
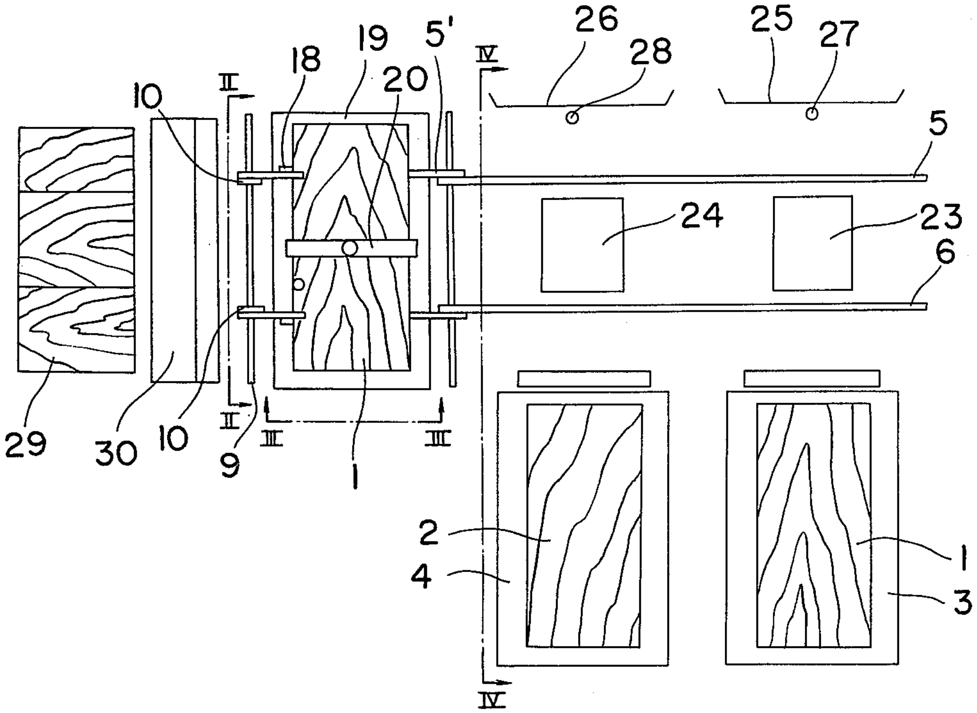
FIG. 1 shows a plan view of veneer sheet piling apparatus according to present invention.
Figure 4:
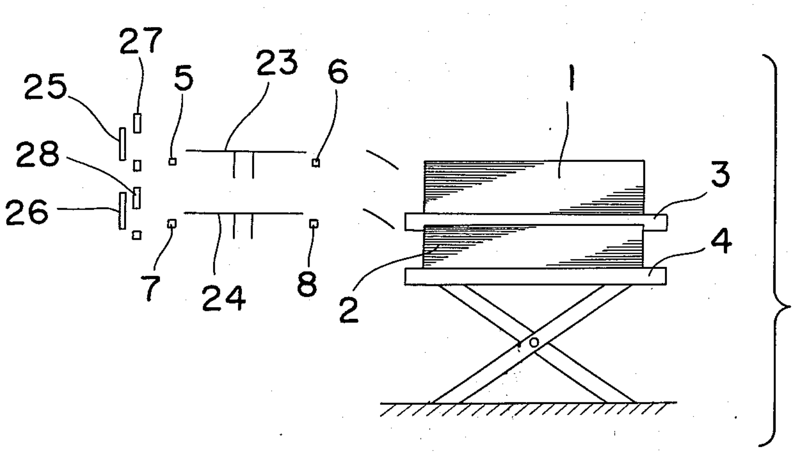
FIG. 4 shows a partial front view taken along the line IV—IV of FIG. 1.

As shown in FIGS. 1 and 4, the upstream side conveyer section is provided with veneer sheet supports 23 and 24 between the belts 5 and 6, and 7 and 8, respectively. The supports 23 and 24 are provided with smooth surfaces having, low frictional coefficients for the veneer sheets and are vertically movable between a position higher than the level of the belts 5 and 6 and a lower position lower than the belts 7 and 8.

Laterally outside from the belts 5 and 7, stoppers 25 and 26 are secured to stop veneer sheets which are manually fed from the piling table 3 and 4 respectively. Adjacent to the stoppers 25 and 26, photoelectric cell means 27 and 28 are provided to detect the presence of veneer sheet at a proper position to be conveyed and transmit output signals to lower the supports 23 and 24, respectively.

The operation of the apparatus is as follows.

As shown in FIG. 4, when the veneer sheet supports 23 and 24 are higher than cooperating belts 5 and 6, and 7 and 8, veneer sheets 1 and 2 are fed manually from the piling tables 3 and 4 onto the supports 23 and 24.

As the veneer sheets 1 and 2 stop by engaging with the stoppers 25 and 26, the photoelectric cells 27 and 28 detect the presence of the veneer sheets and apply output signals to lower the veneer sheet supports 23 and 24. The veneer sheets 1 and 2 are conveyed substantially at right angles to fiber direction of the veneer sheets.

The veneer sheets 1 and 2 are conveyed to the downstream conveyer sections having belts 5' and 6', and 7' and 8' and are stopped by the veneer sheets stopping means 15.

The veneer sheet stopping means 15 guides the front edge of the veneer sheet 1 between the rollers 16 and 17 and then stops the veneer sheet by the stopper 18. By stopping the veneer sheet 1, the belts 5' and 6' receive considerable frictional force which is greater than coupling force between the flange 10 and the magnets 13, so that the conveyer section with the belts 5' and 6' also stops while the shaft 9 is idling.

When the veneer sheets 1 and 2 both stop by stoppers 18 on the stopped conveyer belts 5' and 6' and 7' and 8', the front edges of the veneer sheets 1 and 2 are vertically aligned.

As the veneer sheets 1 and 2 reach photoelectric cells 21 and 22 just before the sheets are stopped by the stoppers 18, the presence of the veneer sheets is detected by the photoelectric cells 21 and 22 which transmit output signals to the two input AND circuit 32. When both signals are applied to the AND circuit 32, an output signal is transmitted from the AND circuit 32 to the timer circuit 33 which after a predetermined delay time transmits a signal to initiate the downward stroke of the presser body 20.

When the downward stroke of the presser body 20 is initiated, the presser body 20 moves downwards quickly and presses the veneer sheets 1 and 2 at their middle portions. The veneer sheets maintain their vertically aligned front edges and are moved downwards in layers onto the piling table 19. The stroke of the presser body 20 is sufficient to reach the table 19, so that the sheets are piled accurately at the predetermined piling position of the table. With the downward movement of the veneer sheets, the sheets flex downwards until both edges of the sheets are free from the edge supporting belts 5' and 6', and 7' and 8'.

By repeating the operation, front and rear veneer sheets are piled on the table 19 in such a position that chosen edges of the sheets are aligned vertically with each other.

As shown in FIG. 1, on the downstream side of the piling table 19, a spreader 30 to coat adhesive agent on both surfaces of a middle veneer sheet 29 may be provided. Each time after piling the front and rear veneer sheets 1 and 2 are pressed by the presser body 20 and piled on the table 19, the middle sheet 29 is supplied on the table 19 through the spreader 30 manually or mechanically. Thus, the piled veneer sheets on the table 19 form three ply plywood sheets. Thus, one edge of each plywood sheet is accurately aligned. Also the process to form plywood sheets is greatly simplified.

Figure 10:
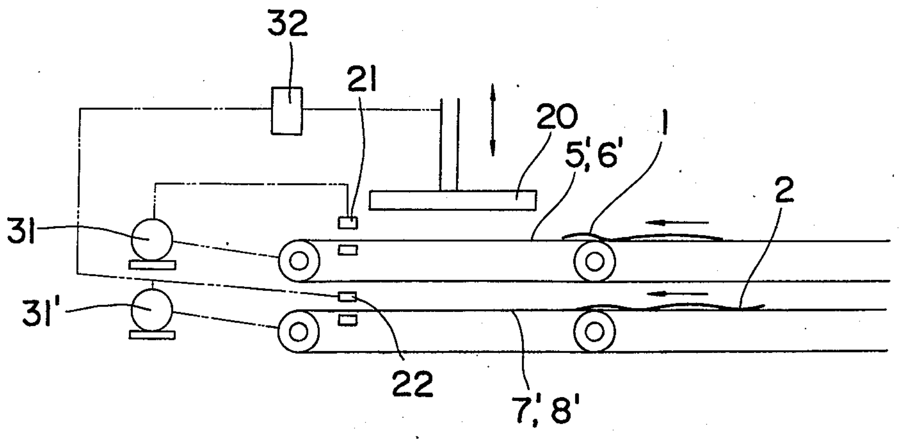
FIG. 10 shows a side view of a veneer sheets piling apparatus, according to a second embodiment of the present invention.

In the embodiment shown in FIG. 10, in place of the magnetic clutch 10 and 12 and the stopper means 15 shown in FIG. 1, clutch brakes 31 and 31' are provided to connect between the drive motor and the downstream side conveyer sections. When the photoelectric cells 21 and 22 detect the presence of the veneer sheets, first and second signals are transmitted from each cell. The first signal is applied to actuate the clutch brake 31 or 31' to disconnect the shaft 9 of the conveyer section from the drive motor and apply brake to the shaft 9. Thus the belts 5' and 6' or belts 7' and 8' are stopped to put the veneer sheet at the desired position.

The second signal from the photoelectric cells 21 and 22 is transmitted to the two input AND circuit 32 as before to initiate the downward stroke of the presser body 20. In the present embodiment, as the detection and stop of the veneer sheets are performed substantially simultaneously, no timer means is necessary.

Also the belts may be deformed elastically while the veneer sheet passes between the belts.

In the embodiments described, two spaced belts are used as conveyer support elements. However, perforated belts connected with vacuum means from the upper surface to hang a veneer sheet on their lower surface by vacuum can be used in place of plane belts.

As described in detail, according to the present invention, a plurality of veneer sheets conveyed on conveyer support elements which are arranged vertically in multiple stages are positioned that one edge of each sheet is vertically aligned, and after that a presser body presses the veneer sheets downwards simultaneously onto the piling table on which the sheets are piled, maintaining the aligned state.

Thus, after the veneer sheets are free from each conveyer support element, the veneer sheets maintain aligned position by friction between the presser body and uppermost sheet and between the overlying and underlying sheets, and the sheets are piled in the correct position on the piling table.

Between two piling operations, a middle sheet coated with adhesive on both surfaces may be piled on the piling table, to perform efficient plywood production.

What is claimed is:

1. A method of piling veneer sheets comprising the steps of:

conveying a plurality of flexible veneer sheets on a plurality of vertically spaced horizontal conveyer means each conveying a veneer-sheet, the conveyer means being in vertical alignment with each other and each conveyer means having two spaced elongated veneer sheet conveyer support elements which support both lateral opposite edge portions of the veneer sheet;

stopping the advance of each veneer sheet when one edge of the sheet reaches a predetermined position in vertical alignment with the corresponding edges of the other veneer sheets; and pressing middle portions of the veneer sheets quickly and vertically from above to lower the sheets onto a predetermined piling position which is under the plurality of conveyer means.

2. A method as claimed in claim 1, wherein said one edge of each sheet is either the front or the rear edge of each veneer sheet.

3. A method as claimed in claim 2, in which a vertically movable piling table is provided at said piling position, which table is lowerable according to the piled thickness of veneer sheets.

4. A method as claimed in claim 3 further comprising a step of piling onto the piled veneer sheets a veneer sheet coated with adhesive on both surfaces.

* * * * *